US008737993B2

(12) United States Patent
Alves et al.

(10) Patent No.: US 8,737,993 B2
(45) Date of Patent: *May 27, 2014

(54) SYSTEMS AND METHODS FOR PROVIDING VOICE/DATA COMMUNICATION SYSTEMS AND VOICE/DATA COMMUNICATIONS

(75) Inventors: Benjamin Alfred Alves, Flower Mound, TX (US); Adeline Pang, San Jose, CA (US); Alan R. Loudermilk, Chicago, IL (US)

(73) Assignee: RPX Corporation, San Francisco, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 11/590,654

(22) Filed: Oct. 30, 2006

(65) Prior Publication Data
US 2007/0147270 A1    Jun. 28, 2007

Related U.S. Application Data

(63) Continuation of application No. 11/080,076, filed on Mar. 14, 2005, now Pat. No. 7,130,279, which is a continuation of application No. 09/680,634, filed on Oct. 6, 2000, now Pat. No. 6,868,070.

(51) Int. Cl.
*H04W 4/00* (2009.01)
*H04L 12/28* (2006.01)
*G06Q 30/00* (2012.01)
*G06Q 40/00* (2012.01)
*G06F 15/16* (2006.01)
*G06F 15/173* (2006.01)

(52) U.S. Cl.
USPC .................... 455/435.1; 455/435.2; 370/255; 370/256; 370/408; 705/14.17; 705/14.23; 705/14.25; 705/26.1; 705/27.1; 705/29; 705/35; 705/44; 709/203; 709/217; 709/223; 709/226

(58) Field of Classification Search
CPC ... H04W 84/18; H04W 60/00; H04W 84/045; H04W 60/04; H04W 48/16; H04L 47/70; H04L 45/02; H04L 41/12; H04L 41/28; H04L 41/0806; G06Q 20/4012; G06Q 40/00; G06Q 20/40; G06Q 20/4016
USPC .......... 370/255, 256, 408; 709/203, 223–226, 709/217; 705/14.17, 14.23, 14.25, 14.26, 705/26–27, 29, 35, 36, 44, 1, 37; 455/435.1
See application file for complete search history.

(56) References Cited

U.S. PATENT DOCUMENTS 5,195,086 A    3/1993    Baumgartner et al. ....... 370/264
(Continued)

OTHER PUBLICATIONS

Black, ATM Foundation for Broadband Networks, pp. 137-152, 170-173 (1995).
(Continued)

*Primary Examiner* — Inder Mehra
(74) *Attorney, Agent, or Firm* — Howison & Arnott, L.L.P.

(57) ABSTRACT

System and method for selling, configuring, installing, reconfiguring and servicing integrated voice/data communications systems are disclosed. An Internet/web based portal is provided to enable a high level of data to be easily collected. The portal guides the customer or sales persons in the collection of user requirements data indicative of the particular customer's hardware, telephony and network service requirements. Test of the data is performed, ensuring that all required data has been entered. The user requirements data is translated into configuration data in order to configure the system in a manner to satisfy the user requirements data. Configuration data resulting from a user requirements data entry and translation process is coupled with a hardware manufacturing process to produce an integrated system configured for the particular customer. A centralized intelligence ensures that the installed system will work correctly and in accordance with the requirements of the particular customer, to facilitate equipment upgrades and the provision of WAN or other network services to the customer.

20 Claims, 4 Drawing Sheets

(56) References Cited

U.S. PATENT DOCUMENTS

| | | | |
|---|---|---|---|
| 5,333,266 A | 7/1994 | Boaz et al. | 709/206 |
| 5,475,738 A | 12/1995 | Penzias | 379/67 |
| 5,479,411 A | 12/1995 | Klein | 379/88 |
| 5,533,018 A | 7/1996 | DeJager et al. | 370/352 |
| 5,533,110 A | 7/1996 | Pinard et al. | 379/201 |
| 5,541,921 A | 7/1996 | Swenson et al. | 370/376 |
| 5,568,540 A | 10/1996 | Greco et al. | 379/89 |
| 5,652,789 A | 7/1997 | Miner et al. | 379/201 |
| 5,659,597 A | 8/1997 | Bareis et al. | 455/563 |
| 5,689,553 A | 11/1997 | Ahuja et al. | 379/202 |
| 5,761,201 A | 6/1998 | Vaudreuil | 370/392 |
| 5,778,058 A | 7/1998 | Gavin | 379/225 |
| 5,809,021 A | 9/1998 | Diaz et al. | 370/364 |
| 5,809,493 A | 9/1998 | Ahamed et al. | 706/52 |
| 5,812,795 A | 9/1998 | Horovitz et al. | 709/245 |
| 5,821,937 A | 10/1998 | Tonelli et al. | 345/356 |
| 5,838,664 A | 11/1998 | Polomski | 370/263 |
| 5,838,923 A | 11/1998 | Lee et al. | 709/236 |
| 5,841,763 A | 11/1998 | Leondires et al. | 370/260 |
| 5,862,136 A | 1/1999 | Irwin | 370/395 |
| 5,864,560 A | 1/1999 | Li et al. | 370/465 |
| 5,867,714 A | 2/1999 | Todd et al. | 717/172 |
| 5,887,139 A | 3/1999 | Madison, Jr. et al. | 709/223 |
| 5,898,830 A | 4/1999 | Wesinger, Jr. et al. | 713/201 |
| 5,912,888 A | 6/1999 | Walsh et al. | 370/355 |
| 5,923,737 A | 7/1999 | Weishut et al. | 379/93.17 |
| 5,926,463 A | 7/1999 | Ahearn et al. | 370/254 |
| 5,940,488 A | 8/1999 | DeGrazia et al. | 379/201 |
| 5,944,786 A | 8/1999 | Quinn | 709/206 |
| 5,950,167 A | 9/1999 | Yaker | 704/275 |
| 5,978,672 A | 11/1999 | Hartmaier et al. | 455/413 |
| 5,978,835 A | 11/1999 | Ludwig et al. | 709/204 |
| 5,982,767 A | 11/1999 | McIntosh | 370/352 |
| 5,991,723 A | 11/1999 | Duffin | 704/260 |
| 5,996,010 A | 11/1999 | Leong et al. | 709/223 |
| 5,999,179 A | 12/1999 | Kekic et al. | 345/349 |
| 6,003,077 A | 12/1999 | Bawden et al. | 709/223 |
| 6,012,088 A | 1/2000 | Li et al. | 709/219 |
| 6,018,567 A | 1/2000 | Dulman | 379/34 |
| 6,040,834 A | 3/2000 | Jain et al. | 345/356 |
| 6,041,306 A | 3/2000 | Du et al. | 705/8 |
| 6,043,816 A | 3/2000 | Williams et al. | 345/340 |
| 6,044,107 A | 3/2000 | Gatherer et al. | 375/222 |
| 6,044,403 A * | 3/2000 | Gerszberg et al. | 709/225 |
| 6,047,053 A | 4/2000 | Miner et al. | 379/201 |
| 6,047,054 A | 4/2000 | Bayless et al. | 379/202 |
| 6,049,531 A | 4/2000 | Roy | 370/260 |
| 6,054,987 A | 4/2000 | Richardson | 345/348 |
| 6,055,574 A | 4/2000 | Smorodinsky | 709/226 |
| 6,199,099 B1 * | 3/2001 | Gershman et al. | 709/203 |
| 6,317,783 B1 | 11/2001 | Freishtat et al. | 709/218 |
| 6,470,321 B1 * | 10/2002 | Cumming et al. | 705/4 |
| 6,473,898 B1 * | 10/2002 | Waugh et al. | 717/168 |
| 6,651,063 B1 | 11/2003 | Vorobiev | 707/10 |
| 6,675,211 B1 * | 1/2004 | Mamaghani et al. | 709/224 |
| 6,675,229 B1 * | 1/2004 | Bruno et al. | 719/328 |
| 7,155,409 B1 * | 12/2006 | Stroh | 705/37 |
| 2001/0039579 A1 * | 11/2001 | Trcka et al. | 709/224 |
| 2004/0039561 A1 * | 2/2004 | Montano et al. | 703/22 |
| 2005/0102199 A1 * | 5/2005 | Lee | 705/27 |
| 2005/0283410 A1 * | 12/2005 | Gosko | 705/27 |
| 2007/0162348 A1 * | 7/2007 | Lewis | 705/26 |

OTHER PUBLICATIONS

Stallings, William, SNMP, SNMPv2, SNMPv3 and RMON 1 and 2 third edition, pp. 44-43, 76-77, 80-81, 85-86, 99-101, 110, 138-141, 43-144, 150-152, 155-157, 179, 181-183 (1996).

* cited by examiner

SYSTEMS AND METHODS FOR PROVIDING VOICE/DATA COMMUNICATION SYSTEMS AND VOICE/DATA COMMUNICATIONS

This application is a continuation of U.S. application Ser. No. 11/080,076, filed Mar. 14, 2005, now U.S. Pat. No. 7,130,279, which is a continuation of U.S. application Ser. No. 09/680,634, filed Oct. 6, 2000, now U.S. Pat. No. 6,868,070.

FIELD OF THE INVENTION

The present invention relates to systems for providing voice and data communications, and more particularly to systems and methods for configuring, manufacturing, testing, installing and reconfiguring such voice/data communications systems and such voice/data communications.

BACKGROUND OF THE INVENTION

Systems for providing voice and data communications in office and other settings are receiving substantial commercial acceptance. Examples of such "convergent" voice/data communication systems are disclosed in U.S. application Ser. Nos. 09/055,072, 09/167,408, 09/283,101 and 09/368,460, which are assigned to the assignee of the present invention and incorporated herein by reference. Such systems provide desirable voice/data communications with a highly integrated system.

Such systems, however, provide a large number of features and options for configuring the system for the particular office environment. Exemplary information required to configure such a system include telephone subscriber directory information, WAN network configuration parameters such as T-1 channel data and voice trunk access, company call routing scenarios, voice mail parameters, LAN data network connection information and the like. Traditionally, there were persons skilled in telecommunications aspects of such systems (such as persons responsible for selling, configuring and installing PBXs, voice mail systems, telephone network connection services and the like), while different persons were skilled in data communication aspects of such systems (such as persons responsible for selling, configuring and installing LAN/WAN hardware and the like). In general, it has been difficult to locate and/or train persons sufficiently knowledgeable in both the telecommunications and data communications aspects of such systems, as the two fields historically have been quite distinct.

As a result, it has become difficult to sell, configure, install, reconfigure and/or service such integrated voice/data communications systems, and such activities generally have been more labor intensive than desired.

SUMMARY OF THE INVENTION

In accordance with embodiments of the present invention, web/portal-based systems and methods for selling, configuring, installing, reconfiguring and servicing such integrated voice/data communications systems are provided. In accordance with exemplary preferred embodiments of the present invention, an Internet (e.g., world wide web) or personal digital assistant ("PDA") or personal computer ("PC") based portal is provided to enable a relatively high level of data to be more easily collected (the PDA or PC may be connected to a website while data is input, or it may be connected at a later time, with a previously downloaded or installed template used to guide the data input, etc). The portal preferably is graphical and guides either the customer or one or more sales persons (or site installer/technician, etc.) in the collection of data regarding the particular customer's hardware, telephony and network service requirements. It is important to note that this relatively high level of data is not data at a level or in a form to be directly used to configure the hardware of such an integrated voice/data communications system. Rather, this relatively high level of data is a less technical, more intuitive level of user requirements data, that is more readily understandable to the customer and/or sales personnel, even if such persons do not have extensive technical training with respect to the telecommunications and/or data communications hardware/software included in such systems.

After collecting the relatively high level user requirements data, an initial test of the data preferably is performed, such as for purposes of data consistency, ensuring that all required data has been entered and the like. In certain embodiments, the portal runs an application or applet in real time or promptly after data entry in order to provide such an initial test of the user requirements data, and preferably at the time of data entry. Thereafter, the user requirements data is translated into configuration data, preferably by way of automatic (or semi-automatic) software tools. This translation preferably produces configuration data that may be output in a form that it may be installed or input into the integrated voice/data communications system in order to configure the system in a manner appropriate to satisfy the user requirements data. After such translation, the resulting configuration data optionally is tested, such as for purposes of data consistency, validation and the like. After either the initial test of the user requirements data or the test of the configuration data resulting from the translation, software/hardware tools implementing the test and/or translation may prompt a request for further data input, preferably at the user requirements data level, which may then be tested, translated into configuration data and repeated, as may be necessary in order to produce configuration data for the particular integrated voice/data communications system for the particular customer.

Also in accordance with preferred embodiments of the present invention, such portal-based user requirements data entry is coupled to, and part of, a method for selling, ordering, manufacturing, testing and installing such integrated voice/data communications systems. Configuration data resulting from a user requirements level data entry and translation process is coupled at a desirable point with a hardware manufacturing process, such that an integrated system configured for the particular customer is produced. Also in accordance with such preferred embodiments, such an integrated system may be tested, preferably based on the particular, customer-specific configuration, in order to ensure that the configured system will be fully operational in the desired manner when installed at the particular customer's facility. In certain preferred embodiments, the testing may be conducted by connection to a central data storage facility that stores, preferably centrally, configuration and test data for a number of particular customers. In this manner, a centralized intelligence may be involved in the configuration and testing of such integrated systems, thereby helping to facilitate configuration and testing, and thereby helping to ensure that the installed system will work correctly and in accordance with the requirements of the particular customer. Such a centralized intelligence also may be used to facilitate equipment upgrades and the provision of WAN or other network or other services to the particular customer.

In alternative embodiments, such a centralized storage and intelligence not only facilitates initial configuration and testing, but also is accessible as desired in order to facilitate reconfigurations of such integrated voice/data communications systems. In accordance with the present invention, portal-based configurations and reconfigurations are possible, which preferably are accompanied by a portal-based communication system such that status information regarding the configuration, manufacturing, testing, installation, reconfiguration, etc., may be communicated to customers and/or sales personnel in a timely and convenient manner.

Accordingly, it is an object of the present invention to address limitations of conventional techniques for configuring, manufacturing, testing, installing and reconfiguring such integrated voice/data communications systems.

It is another object of the present invention to provide a portal-based method for collecting user requirements data for such integrated voice/data communications systems, and for generating in a preferably automatic manner via translation configuration data based on the user requirements data.

It is another object of the present invention to provide a method for manufacturing, testing and installing such integrated voice/data communications systems based on such configuration data generated from a translation of user requirements data.

Finally, it is an object of the present invention to provide a method for reconfiguring and/or upgrading such integrated voice/data communications systems based on such portal-based data input, and preferably utilizing a centralized data storage and intelligence.

BRIEF DESCRIPTION OF THE DRAWINGS

The present invention may be more fully understood by a description of certain preferred embodiments in conjunction with the attached drawings in which.

DETAILED DESCRIPTION OF THE PREFERRED EMBODIMENTS

The present invention will be described in greater detail with reference to certain preferred embodiments and certain other embodiments, which may serve to further the understanding of preferred embodiments of the present invention. As described elsewhere herein, various refinements and substitutions of the various embodiments, and the use of aspects in various combinations and subcombinations, are possible based on the principles and teachings herein.

Figure 1:
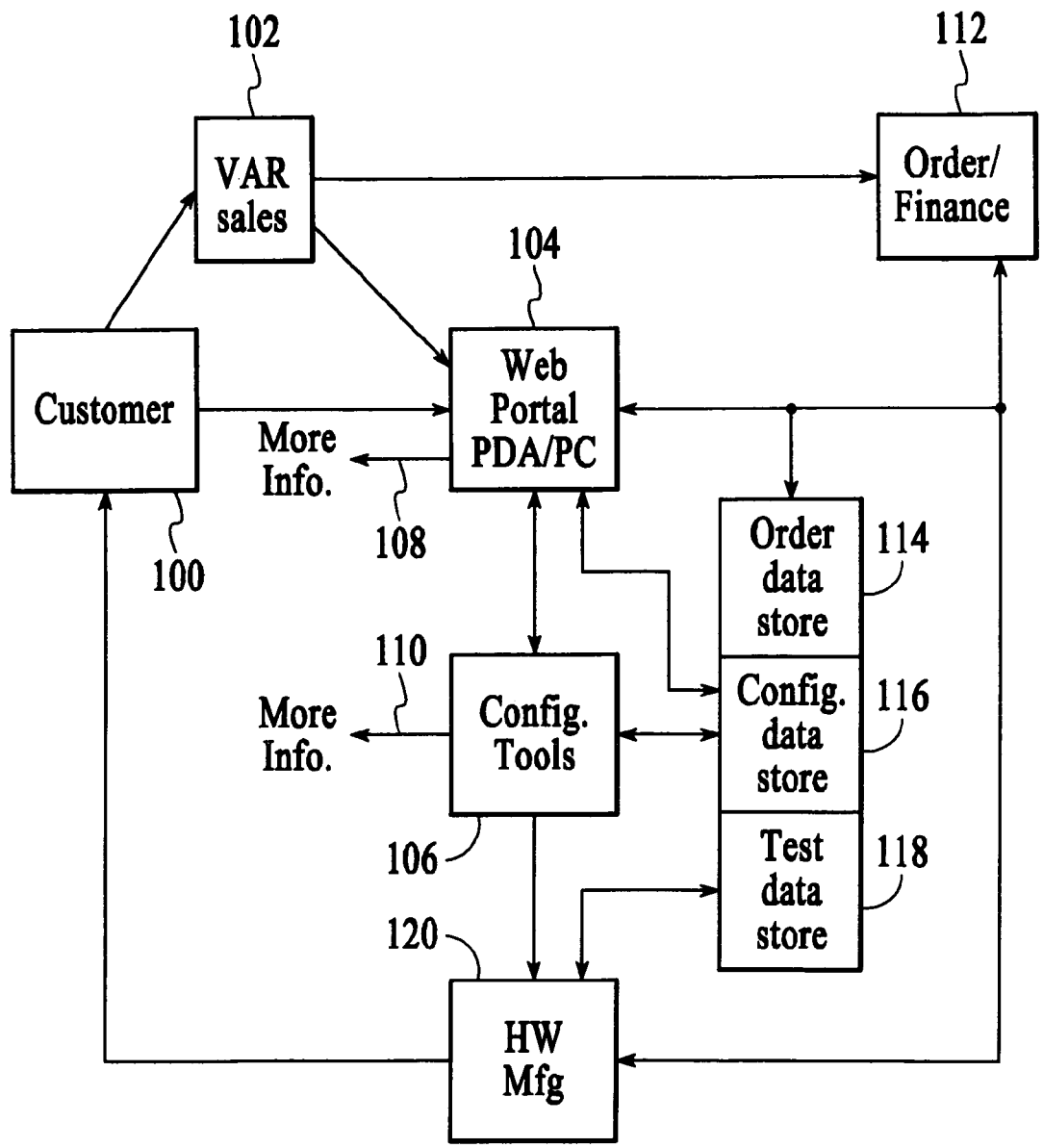
FIG. 1 is a flow chart illustrating first exemplary preferred embodiments of a portal/PDA/PC based data method for selling, configuring, manufacturing, testing, installing and reconfiguring integrated voice/data communication systems in accordance with the present invention.

With reference to FIG. 1, first exemplary preferred embodiments will now be described. In such embodiments, it is to be understood that methods in accordance with such preferred embodiments relate to selling, configuring, manufacturing, testing, installing and reconfiguring integrated voice/data communication systems such as described in U.S. application Ser. Nos. 09/055,072, 09/167,408, 09/283,101 and 09/368,460, the entire disclosures of which are expressly incorporated herein by reference. Exemplary customer 100 preferably interacts with portal 104 directly, or via value added reseller ("VAR") or sales agent 102, such as, for example, by initiation of a commercial transaction by which customer 100 seeks to purchase or configure such an integrated voice/data communications system. Portal 104 preferably is an Internet-based world wide web-based portal, although in alternative preferred embodiments may be an application running on a PDA or PC that is subsequently connected via WAN or LAN for connection with another computer or portal, etc. In the description herein, the term portal is used to encompass both the preferred web-based portal and also PDA or PC-based methods, unless expressly stated otherwise. It also is to be noted that the PDA or PC-based embodiments may, for example, download an applet including a template, etc., for input of the customer requirements data, and the PDA or PC may subsequently be connected to, and/or synchronized with, a website, portal or central computer, in accordance with the present invention.

Portal 104 preferably provides a graphical interface to customer 100 and/or VAR/sales agent 102 for input of user requirements data corresponding to customer 100. In accordance with the present invention, the user requirements data consist of relatively high level data that are intended to result at the end of the process in an integrated voice/data communications system that is configured for the particular requirements of customer 100, but which is relatively non-detailed technical data that is relatively more intuitive than the much more detailed technical data that is required to implement the specific configuration of the integrated system. Portal 104 preferably consists of a series of screens or pages that prompt customer 100 and/or VAR/sales agent 102 for user requirements data. Thus, via a series of prompts/responses or questions/answers, customer 100 and/or VAR/sales agent 102 preferably are prompted to enter the necessary user requirements data via portal 104. In alternative preferred embodiments, certain customer requirements data such as subscriber directories (user name, telephone extensions, telephony/voice mail options, etc. or user names/passwords/IP addresses, etc.) may be input via a template or data structure that is preferably downloaded via portal 104, with a file containing the requested data in accordance with the template or data structure subsequently uploaded via portal 104. Alternatively, such customer requirements data may be input directly via portal 104. In preferred embodiments, each of customers 100 (and/or VAR/sales agents 102) is assigned identification numbers or codes (e.g., customer numbers) (portal entry preferably is controlled by login/password procedures, which may be conventional in methodology), and each purchase of one or more such integrated systems is assigned a transaction number or the like. What is important is that entry to portal 104 be controlled from a security standpoint, and also that particular customers 100 and VARs/sales agents 102 and transactions be identifiable, both to portal 104 and customers 100 and/or VARs/sales agents 102, etc. Preferably, each customer 100 has associated therewith a customer profile, which may be initially stored for new customers, and then retrieved for the particular customer upon subsequent visits to portal 104.

Portal 104 preferably initially tests or screens the user requirements data as it is being input, either via ensuring that required fields have data entered that meet the requirements of the particular fields, or via a software based data screening algorithm, such that customer 100 and/or VAR/sales agent 102 may be promptly informed whether portal 104 has determined that additional user requirements data is needed or desired (see arrow 108, which may be an additional portal prompt or may be a prompt or request later sent by electronic mail, etc.). Portal 104 thus first tests the input of the user requirements data for consistency, incompleteness or other errors or the like such that customer 100 and/or VAR/sales agent 102 may be timely prompted to enter additional or corrected user requirements data.

It should be noted, as will be understood by those skilled in the art, that portal 104 is an interface to one or more computers, web servers, etc., that control data input to and output from portal 104. Connected to or a part of such one or more computers preferably are computer storage resources, such as illustrated by storage areas 114, 116 and 118, which store, preferably, order data (illustrative examples being customer purchase order or other customer identification or financial or business type information, which may include order processing status information), configuration data (e.g., generated configuration data and/or the user requirements data that generated the configuration data), or test data (e.g., data generated upon testing of an integrated system configured in accordance with the configuration data and/or upon test-related processing of the configuration data, or data for testing the particular system), respectively. What is important is that, in accordance with preferred embodiments, a centralized storage location (or locations) is provided to store information relating to customer 100 or particular orders for integrated systems placed by or on behalf of customer 100 (the arrows into storage areas 114, 116 and 118 are exemplary; the areas may be part of a common storage area, and entry into one storage area may be understood to enable or control entry into other areas, depending upon the particular implementation, etc.).

Via user requirements data entry via portal 104, the hardware requirements of an integrated system that may suitable to satisfy the user requirements may be determined. For example, based on the number of telephone subscribers and computers of customer 100, and based on the specified and/or determined WAN network services or the like (and preferably based on data entered from which a prediction of future requirements is made), the number of stations cards for the telephony devices, network interface cards, LAN ports and the like, hard disk or memory storage requirements and the like may be determined. Preferably, the number and types (including any options) of hardware and preferably price are displayed for customer 100 and/or VAR/sales agent 102 via portal 104 so that a list of the constituent hardware components may be viewed, preferably accompanied by a computed price (which preferably includes any taxes, shipping, labor, insurance or other charges), and customer 100 and/or VAR/sales agent 102 may indicate that it accepts or confirms the hardware components and preferably purchase price in an automated manner. In preferred embodiments, this results in an order being placed via order/finance unit 112, which preferably is a computer based system for receiving and processing such customer orders. As will be appreciated, order/finance unit 112 may be implemented as part of a computer that controls portal 104, or it may be a separate computer that operates in parallel with a computer that controls portal 104. In preferred embodiments, such a commercial transaction is implemented via a computing device coupled to portal 104, such that the hardware specification, user requirements data entry and confirmation that a commercial transaction (e.g., an order for purchase of particular goods and/or services) is being placed may be accomplished in a convenient and preferably electronic manner.

If it is determined that the user requirements data entered via portal 104 is acceptable (e.g., passed the initial screening/testing criteria), then configuration tools 106 processes the user requirements data to generate configuration data. Configuration tools 106 preferably are software-based tools that translate, or map, etc., the user requirements data into configuration data. As the user requirements data consists of relatively high level data that may be readily entered by a person who does not have detailed technical knowledge or expertise regarding how to carry out the generally quite sophisticated and detailed internal configuration process required to specifically configure such an integrated voice/data communications system, in general the user requirements data is not directly utilizable to configure such an integrated voice/data communications system. Thus, the user requirements data must be translated or otherwise converted from the rather intuitive, higher level of data input via portal 104, into the specific configuration parameters and other data that actually implement the particular configuration of the integrated voice/data communications system. Configuration tools 106, which are preferably automatic or semiautomatic software tools that process the user requirements data, carry out this translation or other conversion function.

Configuration tools 106 preferably provide at least a second screening or testing of the user requirements after at least a portion of the translation/conversion process has been performed (configuration tools 106 also may optionally provide a pre-translation/conversion screening or testing). As a result of this screening or testing, configuration tools 106 may determine that additional or corrected user requirements or other data is needed. In this event, configuration tools 106 preferably prompts or requests additional user requirements or other data in order to complete the generation of the configuration data to satisfy the user requirements (see arrow 110, which may be implemented with a prompt via portal 104 and/or an electronic mail message or the like). What is important is that configuration tools 104 test the generated configuration data, and request additional information as required (with the process of receiving user requirements or other data, generating configuration data, testing the configuration data, etc. and repeating the process as necessary) in order to have a high level of confidence that the configuration data will result in an integrated system that satisfies the user requirements data. Configuration data generated by configuration tools 106 preferably is stored in storage area 116.

In preferred embodiments, an order is placed for production of one or more integrated voice/data communications systems via order/finance unit 112 (such as described previously). The order, which preferably confirms a legally binding, commercial transaction for purchase of one or more integrated systems between customer 100 and/or VAR/sales agent 102 and the vendor of the integrated system, prompts a preferably electronically-generated request to manufacturing unit 120 for manufacture of the integrated system. Manufacturing unit 120 may be an in-house manufacturing unit or a contract manufacturer; what is important is that the computer-based method of the preferred embodiments result in the preferably automatic generation of a request to a manufacturing agent to assemble the necessary hardware components to implement the desired integrated system. The order from order/finance unit 112 preferably consists of identification information (e.g., customer identification, purchase order number or other transaction number, etc.), as well as a specification of the hardware components required to satisfy the order (i.e., sufficient information for manufacturing unit 120 to assemble the hardware components of an integrated system to satisfy the order). In particular embodiments, a prompt (window, dialog box, etc.) is made to initiate the legally binding, commercial transaction automatically, such as after confirming that all required fields have data that appears acceptable; in alternative embodiments, such a prompt may be provided prior to completion of data entry into all required fields, but at such time that sufficient data has been entered so that the hardware components determination has been made, etc.

Manufacturing unit 120 also preferably receives from configuration tools 106 an electronic version of the configuration data (generated and tested as previously described), which may be input or installed in the integrated system assembled by manufacturing unit 120 to satisfy the order. In preferred embodiments, the configuration is transferred electronically from 20 configuration tools 106 to manufacturing unit 120 (such as via a LAN or WAN or by electronic mail or the like), and/or may be accompanied by a physical media transmission (such as a CD or DVD ROM or the like, or by way of a hard disk drive, etc.) of the configuration data. In many applications, an end customer desires to have a hard or physical media copy of the configuration data (such as for archive or back-up purposes), and such a physical media copy desirably is provided to manufacturing unit 120 for shipment with the integrated system manufactured by the manufacturing unit, or alternatively may be shipped from configuration tools (or otherwise) to the end customer without going through manufacturing unit 120 (still alternatively, an electronic transmission to manufacturing unit 120 may be followed, after manufacturing and testing by manufacturing unit 120, by generation of the physical medium to be shipped with the system by manufacturing unit 120). What is important is that the configuration data, generated as described above, is provided to manufacturing unit in a form so that the configuration data may be readily loaded into an integrated system manufactured by the manufacturing unit.

With configuration data generated and tested as described previously, manufacturing unit 120 may complete the manufacture and preferably testing of an integrated system that satisfies both the order and the user requirements data. Thereafter, preferably the integrated system is shipped to the customer, which may then unload the integrated system, hook up the necessary telephone, WAN and LAN connections and the like, and then start up and operate the integrated system, with the integrated system providing voice and data communications in accordance with the user requirements data entered via portal 104.

As a particular example, and not in any way intended to limit the applicability of the present invention, it is noted that call routing is an area where customers or VARs, etc. may find configuring such a communications system to handle the exact, desired call routing to be a difficult or time consuming task. In accordance with the present invention, when you are inputting data via the portal (or PDA, PC, etc.), the following sections of a portal, PDA/PC template, etc., may correspond to call routing: Business Hrs, After Hrs, Outbound Calls, Trunk List, Trunk Access. For many customers, their main concern for their phone system often is how are the calls to their main company number being handled. They may not care specifically how calls are routed for different trunks; in many cases they may not know the technical details about different trunk types.

In accordance with the present invention, the portal may present a relatively simple set of non-technical questions to guide the customers/VARs, etc., to input user requirements data regarding the customer's call routing requirements. In such an example, the portal preferably may be organized like a wizard to guide the input of user requirements data in an intuitive and high level manner.

As illustrative examples, the portal may prompt response to the following questions: For the customer's main telephone number, how does the customer want the calls to be handled during business hours? After-hours?
1) Ring the Company Attendant?
2) Forward to a hunt group?
3) Forward to a specific extension?
4) Forward to Automated Attendant and play a greeting?
5) Forward to Automated Attendant and play a menu of options?
If the calls are to be answered by the Company Attendant, who is/are the attendant?

As will be appreciated, the questions are intuitive and at a level to prompt relatively easy to enter responses, as opposed to detailed technical data/coding to actually configure the communications system.

As another example, assume that the customer has only ordered a set of analog loop start trunks, and the billing number for this set of trunks is the company's main telephone number. During business hours, the calls are answered by a receptionist. After hours, the calls are answered by an external answering service. To configure this particular call routing in accordance with the present invention, the following exemplary questions may be utilized:
Section Business Hrs, in an "inbound business" page, answer the following question:
1) For the customer's main telephone number, how does the customer want the calls to be handled during business hours?
Section Business Hrs, in an "operator settings" page, answer the following questions:
2) Select the extension(s) to be used as the Company Attendant.
3) When Company Attendant is not available, where do the calls go?
Section Trunk List, answer the following questions:
4) Create the type of trunks-Analog
5) Is this the main company telephone number ? Yes In accordance with the present invention, rather than have to enter or program detailed technical data, parameters and/or coding into the communications system to implement the desired configuration, relatively simple questions/requests are provided to facilitate the input of a high level of user requirements data, which may then be translated into the detailed configuration information necessary to actually configure the communications system. Compared to the entry of such information in other ways, such as through the use of specific software applications (a sample list of "applets" that might be necessary to configure such a communications system, each requiring technical training or experience, etc., are: First Digit Table applet; User Configuration applet; Mailbox configuration applet; Station Ports; Analog Trunks applet; Trunk Groups applet; User Configuration applet; and Mailbox configuration applet) or detailed technical data entry or software programming, configuration of such communications systems may be more readily achieved in accordance with the present invention.

Figure 2:
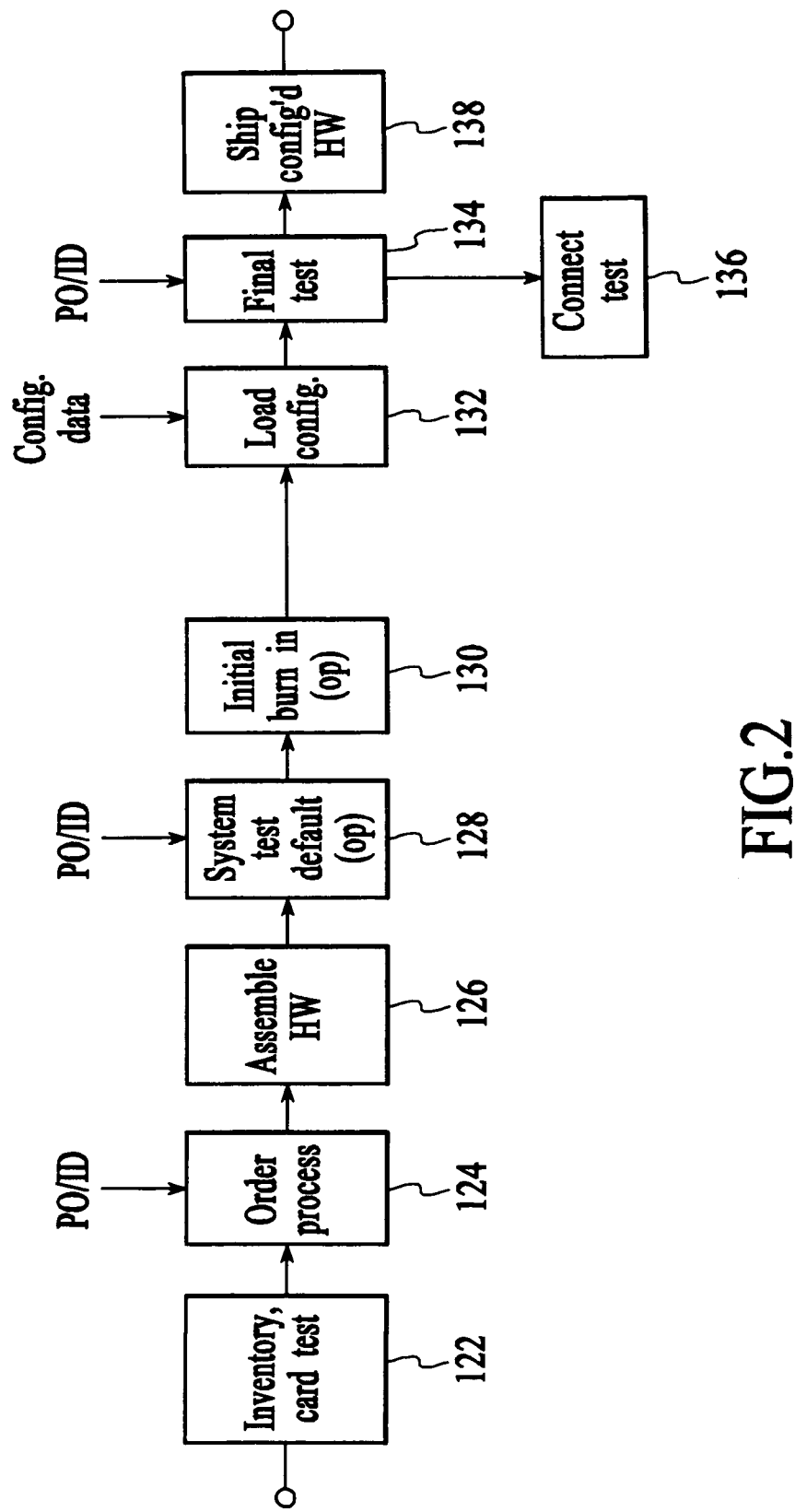
FIG. 2 is flow chart illustrating exemplary preferred embodiments of manufacturing methods for such integrated voice/data communications systems in accordance with the present invention.

Referring now to FIG. 2, illustrative preferred embodiments of manufacturing methods for such integrated voice/data communications systems in accordance with the present invention will now be described.

Manufacturing of such integrated voice/data communications systems typically requires that various physical components be inventoried. As will be appreciated, to accommodate a variety of end-user application requirements, such an integrated voice/data communications system should accommodate a variable number of telephone and computer users. Designing and manufacturing a system that supports, for example, one hundred users when only ten users are anticipated in the office or other environment under consideration would result in wasted resources and expense. Thus, at step 122, in accordance with preferred embodiments, by or on behalf of a manufacturing agent, a number of physical cards or components are inventoried and/or tested such as to be available for manufacturing of an integrated voice/data communications system in accordance with the present invention. For example, telephony station cards, WAN service cards, LAN port cards, etc., as well as other cards/components of such an integrated voice/data communications system may be inventoried/tested at step 122 in accordance with such preferred embodiments of the present invention.

At step 124, a purchase order ("PO"), which may include identification ("ID") information is received by or on behalf of the manufacturing agent. Such a PO typically is processed, which often includes a verification by the manufacturing agent that the particular hardware specified by the PO is a valid manufacturing request, and a request that the manufacturing agent can satisfy based on criteria established by the manufacturing agent and/or the system vendor. The ID information preferably includes an identification of the customer, particular customer transaction, and/or hardware configuration information such that the particular PO may be processed and tracked through the manufacturing process; for example, the hardware configuration information could include (or have encoded therein) model number, chassis style or type, components such as cards and modules, etc., such that at a later step a comparison may be made between the ID information and the actual hardware to determine, for example, if there are any inconsistencies, etc.

At step 126, hardware is assembled to satisfy the particular PO. At such a step, a check may be made, such as via the ID information (which may encode information regarding the hardware configuration, etc., such as previously described), whether the correct hardware components have been assembled to satisfy the particular PO. At step 128, an optional system test is performed. It should be noted that, typically the particular hardware assembled at step 126 is not configured in a particular manner, and thus the hardware configured to satisfy the particular customer requirements is not available for testing. Nonetheless, in certain preferred embodiments, based on the PO or ID information (which may include an identification of the hardware components of the expected system) or otherwise, a first testing of the assembled system may be performed. At this time, for example, if particular hardware components that are expected are not found in the system test, an alarm or other indicator may be initiated such that timely remedial action may be taken (i.e., insert or replace missing or defective cards or components, etc.).

At step 130, an optional initial burn-in is performed. As will be understood, hardware components typically need to be tested under power in order to have infant failures detected so that hardware supplied to the end customer may be more reliable, etc. Thus, at step 130, hardware, preferably preconfigured, may undergo an initial burn -in. During such a burn-in step, or at the conclusion thereof, a system type of test also preferably is performed. Thus, failures in cards or components that manifest themselves during or as a result of such burn-in may be detected, with appropriate remedial measures taken.

At step 132, configuration data, preferably generated by a process described in connection with FIG. 1, is applied or installed in the assembled and (preferably) tested/burned-in hardware. It is at this time that the assembled hardware more specifically is configured to satisfy the user requirements data input/generated as a result of a process described in connection with FIG. 1. Optionally at this step a confirmation is made, such as via the PO and/or ID information, that the correct configuration has been applied or installed. As a results, a test or screening of configuration data application/installation errors may be desirably applied.

At step 134, a testing of the assembled/configured hardware is conducted. This preferably includes an input of the PO and/or ID information such that the test procedure is conducted in accordance with information that corresponds with the particular PO or ID information. For example, at step 134, one or more tests may be performed such that the hardware of the assembled system is detected as part of the test, and a determination is made whether the detected hardware is consistent with the PO and/or ID information. As an illustrative example, the PO and/or ID information may include (such as in an encoded field or fields) an identification of the expected hardware components of the assembled system, such that a determination may be made as to whether the expected hardware components are detected during the test procedure. Also in accordance with preferred embodiments, step 134 includes connection test 136, which preferably includes an emulated or other connection of the expected telephone and WAN/LAN connections for the particular configured system. For example, preferably emulated telephone connections are made to the telephone station card connections, emulated T-I, ISDN, DSL, POTS or other WAN connections are made to WAN interface connections, and emulated LAN computer connections are made to the LAN ports of the assembled/configured system at step 134. In preferred embodiments, an assembled/configured system has sufficient physical connections made such that the assembled/configured system may be tested in a manner more indicative of the expected physical telephony/WAN/LAN connections that will be made if the system is installed and operated in accordance with the user requirements data input as described in connection with FIG. 1. In such preferred embodiments, a simulation of receiving and placing calls is performed, such that an assembled/configured system may be tested prior to shipment to the particular end customer. Such call simulation testing of system particular assembled/configured systems helps ensure that the system as finally installed at the end user location will operate in an expected and satisfactory manner.

At step 138, assuming for example that the testing conducted at the preceding step(s) results in a satisfactory outcome, the assembled, configured and tested hardware, particularly generated in accordance with the user requirements data and configuration data as input/generated as described in connection with FIG. 1, is shipped to the particular end customer.

Figure 3:
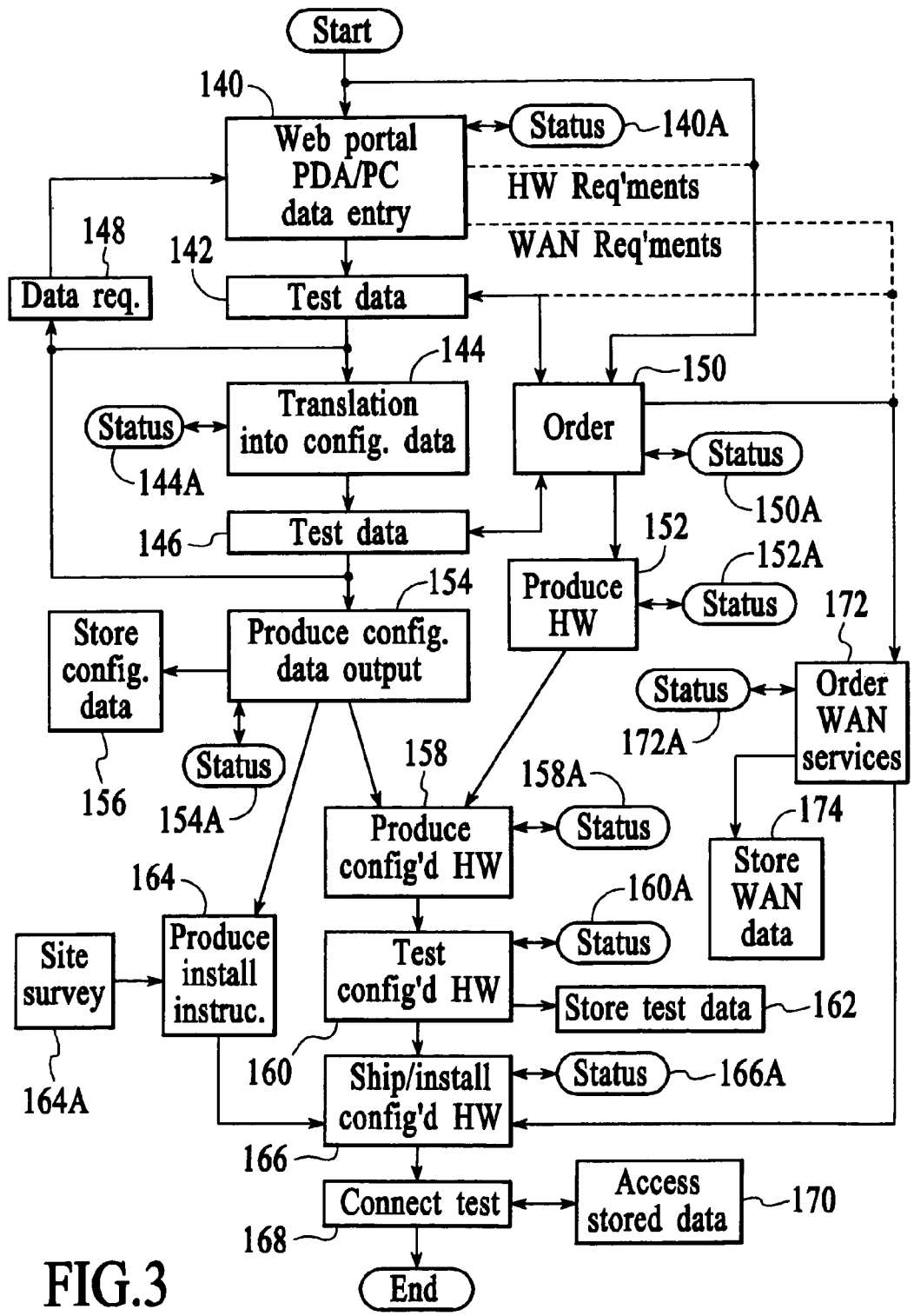
FIG. 3 is a flow chart illustrating additional aspects of preferred embodiments of the present invention.

Referring now to FIG. 3, additional aspects of preferred embodiments of the present invention will now be described.

At step 140, a customer or VAR/sales agent accesses the web portal (or PDA or PC applet, etc.) and enters user requirements data (e.g., as described in connection with FIG. 1, etc.). At this time, a relatively high level of user requirements data is entered, which in accordance with the present invention is not data that may be directly used to configure a particular voice/data communications system in order to satisfy that user requirements data. After interaction with the portal at step 140, at step 140A preferably a central status database is updated in a manner such that a central intelligence may track or determine the status of a customer transaction initiated via the portal. Also as illustrated in FIG. 3, in parallel with or subsequent to, or through, the web portal user requirements data entry of step 140, an order entry step 150 is performed. At step 150 a preferably legally binding purchase or other transaction is initiated, such that the integrated voice/data communications system vendor may begin producing specific hardware and taking the specific actions in order to consummate a commercial transaction based on or corresponding to the portal data entry of step 140.

Also in parallel with or subsequent to, or through, the web portal user requirements data entry of step 140, an optional step 172 is performed, at which time WAN services expected to satisfy the user requirements data entered at step 140 may be ordered. For example, through the user requirements data entry of step 140, a computer coupled to or controlling the portal preferably may predict the number and/or type of WAN services (e.g., number of T-1, POTS or other WAN services) that the end customer may need to satisfy the expected demands based on the user requirements data. Based on stored statistical data, algorithms or otherwise, such a computer coupled to or controlling the portal desirably may guide the user to order the anticipated WAN services that are likely to be needed, preferably in an automated manner (e.g., such as to limit the number of commercial transactions that the end user needs to initiate/consummate in order to ultimately satisfy the end user requirements, etc.). In accordance with such preferred embodiments, step 172 is performed in an automatic or semi-automatic form, such that a transaction to provide the WAN services in order to satisfy the user requirements data may be conveniently and promptly commenced. As a particular example, as part of the user requirements data entry process at step 140, the anticipated level of WAN services necessary or desirable in order to satisfy the user requirements data may be predicted, and the user (or VAR/sales agent) may then be automatically prompted by the portal as to whether some or all of the predicted WAN services should be ordered; thus, for example by clicking an accept or yes button, an order for WAN services may be initiated generally as part of the portal interaction during which the user requirements data is entered. As indicated by step 172A, a preferably central status information database/intelligence preferably is updated as to the status of any such WAN services ordering, and at step 174 a preferably central storage location is updated with data indicative of any WAN services, etc., ordered pursuant to step 172.

At step 142, which may be a part of or in parallel with or subsequent to step 140, a test is made of the user requirements data. At step 142, such as previously described, a first or initial screening or testing of the user requirements data may be made such that it may be promptly determined whether corrected or additional user requirements data is needed or desired. If yes, then a step 148 may be performed, during which the customer (or VAR/sales agent, etc.) is prompted (such as via portal response, email, etc., such as previously described) to provide such corrected or additional user requirements data. In certain preferred embodiments, the order of step 150 (and/or the WAN services ordering step 172) is not performed until the user requirements data of step 142 has been satisfactorily completed. With such a procedure, the (preferably) legally binding commercial transaction of step 150 (and/or step 172) is not initiated until such time as the user requirements data has been at least initially validated. This procedure serves to benefit both the customer (and/or VAR/sales agent), as transactions are initiated after at least a first determination has been made that the user requirements are sufficiently defined to pass the criteria applied at step 142, thereby helping to minimize incorrect or subsequently modified or cancelled transactions, and costs resulting therefrom.

At step 144, assuming that the test/screening criteria applied at step 142 were satisfied, the user requirements data input or generated via the portal is translated into configuration data. Configuration data, as explained in greater detail elsewhere herein, consists of the detailed technical, configuration data that, when applied to appropriately assembled hardware, results in a system that will satisfy the user requirements data. After such translation of the user requirements data into configuration data, at step 146 a further test preferably is conducted. At step 146, the configuration data generated by the translation of the user requirements data may be tested, preferably via simulation or other testing algorithms in an effort to ensure that the configuration is consistent, complete and anticipated to properly configure the assembled hardware. Optionally, the order step of 150 may be initiated in response, or be coupled to, the test data step of 146. For example, the order may be not be processed such that the hardware is produced at step 152 until such time that valid/verified configuration data has been produced. Thus, as errors in user requirements data could result in a change in the hardware specification of the hardware to be assembled, linking the order processing to the test/verify step of 146 in certain embodiments may help to reduce the number of orders that have to modified or cancelled, etc. after the assembly process has begun. In preferred embodiments, as steps 144 and 146 are largely automated and may be conducted relatively quickly, such a linking with the ordering step will not in general lengthen the time for assembling the specific hardware to an appreciable degree.

As will be appreciated from the description herein, if the testing at step 146 indicates that the configuration data is inconsistent, incorrect or incomplete, etc., then a request may be made via step 148 for additional user requirements or other data entry, which preferably may be made via the portal, via email, etc., such as described elsewhere herein.

At step 154, assuming that the test criteria applied at step 146 were satisfied, a configuration data output is generated. This may simply be storing the configuration data in a central or other convenient location, or it alternatively may include a hard or physical medium copy of the configuration, such as on a CD or DVD ROM or on a hard disk, such as may be installed in the assembled hardware and/or shipped with the assembled hardware. As illustrated by step 156, the verified configuration preferably is stored in a location such as storage area 116 and described in connection with FIG. 1.

The output of step 154 preferably includes a tested configuration data output; the output of step 152 preferably includes hardware assembled in accordance with the customer purchase order, which, through the mechanisms described herein, corresponds to and is consistent with the configuration data output. Thus, at step 158, which preferably is conducted by the manufacturing agent, the configuration data is applied to the assembled hardware. The data application preferably is conducted by electronic transmission of the configuration data to the manufacturing agent, which preferably applies the configuration data to the assembled hardware also electronically (alternatively, the manufacturing agent may load the configuration data from the CD or DVD ROM, install the hard disk, or otherwise apply the configuration data from the media in which it was provided to the manufacturing agent). What is important is that the configuration data, generated via the user requirements data, is applied to the assembled hardware in order to result in an assembled and configured, integrated voice/data communications system.

At step 160, the assembled and configured, integrated voice/data communications system, configured in accordance with the particular user requirements data of the particular customer, is tested, preferably by the manufacturing agent. Based on the status or results of the testing of step 160, a central status information database/intelligence is updated, as indicated by step 160A. At step 162, data indicative of the information used to test the manufactured system, or data indicative of the results of such testing, is stored in a preferably central location, such as storage area 118 of FIG. 1.

In certain preferred embodiments, step 164 is performed. As the process through step 154 typically will include detailed information regarding the particular customer hardware/software configuration and preferably LAN and WAN connections to be made with the manufactured system, at step 164 installation instructions are automatically generated, which may be in electronic and/or hardcopy form. In accordance with such embodiments, installation instructions generated in a manner to correspond to the particular configuration of the customer's system (with the configuration being determined as previously described) are automatically generated, thereby facilitating a more convenient and expedient installation of the configured system. In certain embodiments, step 164 is conducted based on site survey data, as indicated by step 164A. In such embodiments, during an evaluation of the actual customer site data is generated to facilitate the physical installation process, which may include information indicative of, for example, physical positioning, number and types of cables, telephones, WAN interfaces, POTS termination points, etc. that are present or to be installed, which may be performed by a representative of the end user/customer, system vendor, etc.; such data may be utilized in step 164 in order to prepare installation instructions that are based on such a site evaluation and more specifically tailored to the specific system installation that is anticipated.

At step 166, the manufactured, configured and tested system, preferably including installation instructions (alternatively, custom, automatically generated manufacturing instructions may be sent electronically to the customer or installation agent, etc.), is shipped to the customer or end user location, where it is installed in accordance with the installation instructions. The central status information database/intelligence preferably is updated at step 166A. At step 168, the installed system preferably is tested, with the test based on the actual WAN/LAN connections of the final installation. In order to facilitate such a connection-based test, stored data (including test or configuration data stored as previously described) may be accessed, as indicated by step 170.

At various steps, the preferably central status information database/intelligence is updated, etc. Thus, preferably at all times of the process, and preferably via the portal, the customer, VAR or other appropriate party may access the central status information database/intelligence in order to obtain up-to-date status information, thereby readily determining at what point in the manufacturing process a particular customer's system may be.

Figure 4:
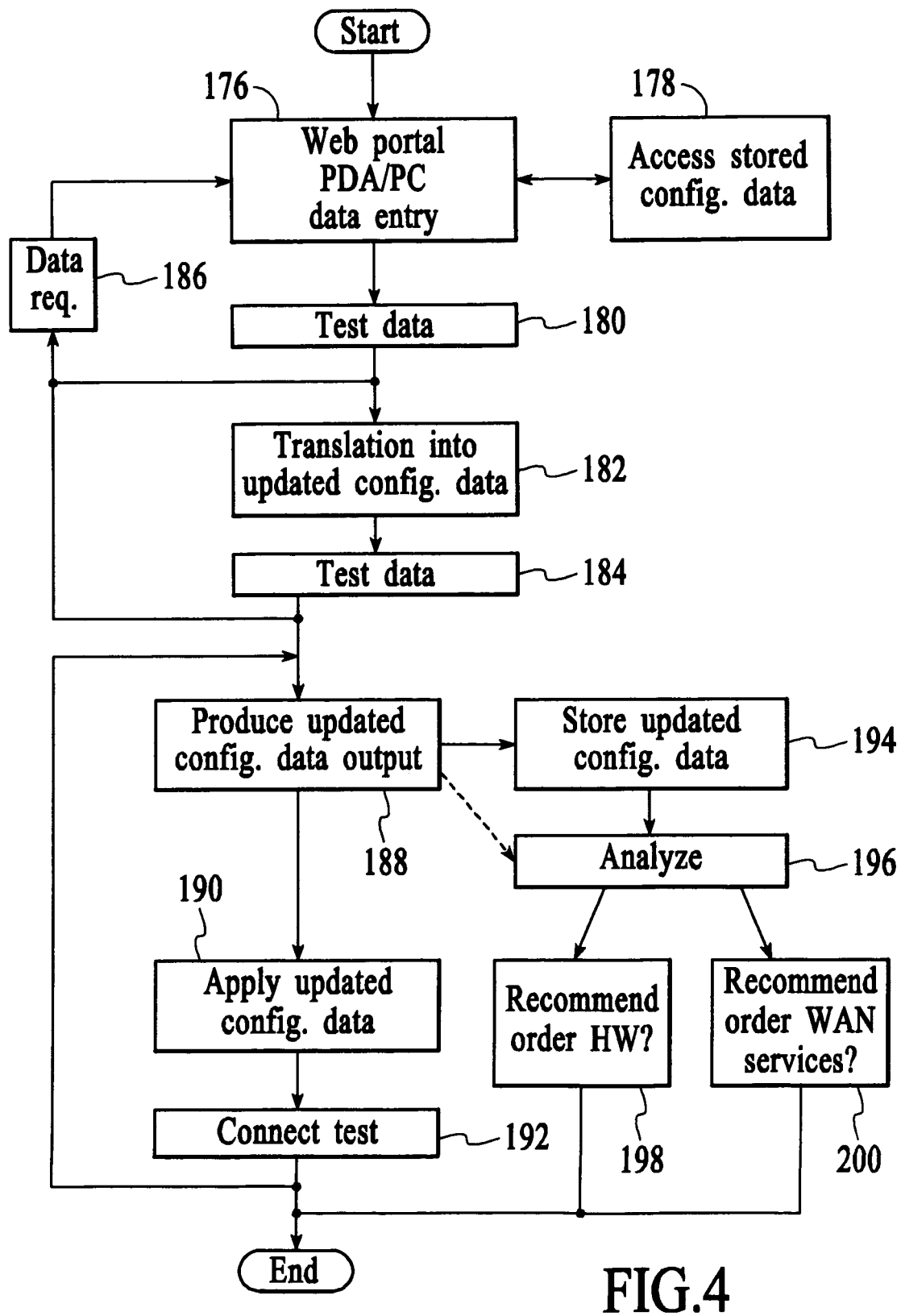
FIG. 4 is a flow chart illustrating additional preferred embodiments in which such integrated voice/data communications systems may be reconfigured and updated in accordance with the present invention.

FIG. 4 is a flow chart illustrating additional preferred embodiments in which such integrated voice/data communications systems may be reconfigured and updated in accordance with the present invention. In such embodiments, one or more integrated voice/data communications systems preferably were previously manufactured in accordance with the present invention. The present invention thereafter contemplates portal-based reconfiguration and updating of such systems.

At step 176, the portal (or PDA or PC-based tool, etc.) is accessed. Preferably a centrally stored database that stores information indicative of the current configuration of the system is accessed, as indicated by step 178. Thus, in accordance with such embodiments, a central storage location stores information regarding the current configuration of such a system, and such storage location may be conveniently accessed in order to make such configuration data available for purposes of facilitating such reconfigurations or updates.

At step 178, the user requirements data that resulted in the configuration data also may be accessed or made available as part of the reconfiguration/update process. At step 176, data may be entered (preferably in the form of user requirements data as previously described) in accordance with the desired reconfiguration/update of the system. As will be appreciated, user requirements data of the current configuration may be obtained via step 178 from a central location (if not already available), and then such user requirements data may be updated at step 176 for the new configuration, etc.

At step 180, an initial test or screening of the data entered at step 176 preferably is conducted. Steps 180 and 186 of FIG. 4 desirably may be conducted in a manner similar to steps 142 and 148 of FIG. 3, described previously. As will be appreciated, through such steps, new user requirements data may be entered in accordance with the desired reconfiguration/update, with the newly-entered data screened for accuracy and completeness, with requests for corrected or additional data promptly initiated.

At step 182, the updated/newly entered user requirements data preferably is translated/converted into updated configuration data. Preferably, step 182 is conducted in a manner similar to step 144 of FIG. 3, and preferably is conducted with the same or similar configuration tools, such as described in connection with FIG. 1. At step 184, the configuration data resulting from step 182 preferably is tested or screened, with additional requests for information prompted in a timely manner. As will be appreciated, steps 184 and 186 may be conducted in a manner similar to steps 146 and 148 of FIG. 3, such as previously described.

At step 188, depending upon the test results of step 184, an output of updated configuration data may be made (which may in a manner analogous to step 154 of FIG. 3, as appropriate). As the system is already manufactured, however, such output of updated configuration data preferably is electronically transmitted for application in the system at step 190, although such output may alternatively, or also, output in the form of a physical medium (CDROM, DVD ROM, hard disk drive, etc.) output. At an appropriate time, such as during after hours of the work environment in which the system is located, the updated configuration data is applied to the system and tested at step 192, which preferably tests the reconfigured system based on the actual WAN/LAN and telephone connections, etc., such as was described with respect to step 168 of FIG. 3.

At step 194, the updated configuration data preferably is stored in a central location (similar to step 156 of FIG. 3), and thus may be available for a further reconfiguration at a later time, also in accordance with the flow of FIG. 4. Thus, reconfigurations may be more readily made over time, as needed, in order to maintain the configuration of the system in a more optimum form for the particular office environment, etc. At step 196, which may be after the storage of step 194 or more directly after production of the updated configuration data at step 188, the updated configuration data (and optionally the original configuration data, which may be retained in the central storage in order to maintain a historical record of the particular system's configuration, etc.) may be analyzed. Such a step 196 may desirably be used to predict that additional hardware or WAN services, etc., may be needed now or in the near future. For example, an analysis of the updated configuration data may indicate that additional station cards or LAN ports, etc. are needed or likely to be needed, and thus at step 198 an automated prompt may be generated that preferably recommends to the customer that it should order additional hardware for the system.

Similarly, based on the updated configuration data, and perhaps based on then-current information regarding available WAN services, at step 200 an automated prompt may be generated that preferably recommends to the customer that it should order or consider additional or other WAN services. For example, the data analysis may indicate that the customer's WAN service needs may be more optimally met with additional or other WAN services. As the availability and pricing of such WAN services tend to vary over time, such a preferably centrally stored configuration data/data analysis may be used to more optimally recommend WAN services for the particular customer, as the customer's needs change over time. It should also be noted that, in alternative embodiments, such a step 200 may be initiated via the portal even without reconfiguration of the system. Thus, a customer may access such a central intelligence and have its configuration data analyzed, with recommendations made for more optimum WAN services as may then be appropriate.

As will be appreciated, in accordance with the present invention, integrated voice/data communications systems may be more optimally and conveniently ordered, configured, manufactured, installed and reconfigured, etc., with status information readily available, preferably via a web or PDA/PC-based portal as described herein.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A method comprising the steps of:
entering user requirements data via a single portal to a centralized intelligence using a software application, wherein the user requirements data comprises intuitive data that includes include information determinative of a hardware configuration of a computing system for providing voice and data communications in accordance with the user requirements data, wherein the hardware configuration includes hardware for providing voice and data communications over one or more WAN or other networks, wherein the user requirements data also include information for a provision of network services by a network services provider;
translating, at the centralized intelligence, at least a portion of the user requirements data into configuration data, wherein the configuration data is stored in a storage location in electronic communication with the portal;
providing the configuration data to a manufacturing agent;
manufacturing the computing system, wherein the step of manufacturing the computing system includes the configuration data within the computing system, wherein the computing system operates based on the configuration data;
providing the computing system to an end user, wherein the computing system is operative to provide voice and data communications to a plurality of users via the network services provided by the network services provider in accordance with the configuration data; and
wherein, prior to the step of manufacturing the computing system, based on the user requirements data entered via the single portal, an order is placed from the centralized intelligence that initiates a commercial transaction for the provision of the computing system for use by an end user, and wherein, prior to the step of providing the computing system for use by an end user, based on the user requirements data entered via the single portal, an order is placed from the centralized intelligence that initiates a commercial transaction for the provision of network services over the one or more WAN or the other networks, wherein the network services provide voice and/or data communications over a wide area network.

2. The method of claim 1, further comprising the step of testing the user requirements data prior to the step of translating the user requirements data and also prior to the step of initiating the second commercial transaction, wherein in response to the testing corrected or additional user requirements data are selectively prompted for entry via the portal.

3. The method of claim 1, wherein the portal comprises a web-based portal.

4. The method of claim 1, wherein the user requirements data include information determinative of the network services.

5. The method of claim 1, further comprising the step of electronically placing an order for manufacture of the computing system, wherein the order comprises a legally binding commercial transaction for the computing system.

6. The method of claim 1, further comprising the step of producing a physical medium containing data generated based on the user requirements data, wherein the physical medium is provided with the computing system after the manufacturing step.

7. The method of claim 1, wherein voice communications are provided over the wide area network via the network services.

8. A method comprising the steps of:
entering user requirements data via a single portal to a centralized intelligence using a software application, wherein the user requirements data comprises intuitive data that includes include information determinative of a hardware configuration of a communications system for providing voice and/or data communications in accordance with the user requirements data, wherein the hardware configuration includes hardware for coupling the communications system to one or more WAN or other networks, wherein the user requirements data also include information for provision of network services by a network services provider;
translating, at the centralized intelligence, at least a portion of the user requirements data into configuration data, wherein the configuration data is stored in a storage location in electronic communication with the portal;
providing the configuration data to a manufacturing agent;
manufacturing the communications system, wherein the step of manufacturing the computing system includes the configuration data within the computing system, wherein the communications system operates based on the configuration data;

providing the communications system to an end user, wherein the communications system is operative to provide voice and/or data communications to a plurality of users via the network services provided by the network services provider in accordance with the configuration data; and wherein, prior to the step of manufacturing the communications system, based on the user requirements data entered via the single portal, an order is placed from the centralized intelligence that initiates a commercial transaction for manufacture of the communications system, and wherein, prior to the step of providing the communications system for use by an end user, based on the user requirements data entered via the single portal, an order is placed from the centralized intelligence that initiates a commercial transaction for provision of network services for providing voice and/or data communications with the communications system via the one or more WAN or other networks.

9. The method of claim 8, further comprising the step of testing the user requirements data prior to the step of translating the user requirements data and prior to the step of initiating the second commercial transaction, wherein in response to the testing corrected or additional user requirements data are selectively prompted for entry via the portal.

10. The method of claim 8, wherein the portal comprises a web-based portal.

11. The method of claim 8, wherein the user requirements data include information determinative of the network services.

12. The method of claim 8, further comprising the step of electronically placing an order for the manufacture of the system, wherein the order comprises a legally binding commercial transaction for the system.

13. The method of claim 8, further comprising the step of producing a physical medium containing data generated based on the user requirements data, wherein the physical medium is provided with the system after the manufacturing step.

14. The method of claim 8, wherein voice communications are provided over the wide area network via the network services.

15. A method comprising the steps of:
entering user requirements data via a single portal to a centralized intelligence using a software application, wherein the user requirements data comprises intuitive data that includes information determinative of a hardware configuration of a computing system for providing voice communications and data communications in accordance with the user requirements data, wherein the hardware configuration includes hardware for coupling the computing system to one or more WAN or other networks, wherein the computing system includes hardware for connecting the computing system to a local area network, wherein the user requirements data also include information for provision of network services by a network services provider;

translating, at the centralized intelligence, the user requirements data into configuration data, wherein the configuration data is stored in a storage location in electronic communication with the portal;

providing the configuration data to a manufacturing agent;

manufacturing the computing system, wherein the step of manufacturing the computing system includes the configuration data within the computing system, wherein the computing system operates based on the configuration data;

providing the computing system to an end user, wherein the computing system is operative to provide voice communications and data communications, wherein the voice communications are provided to a plurality of users via network services provided by the network service provider in accordance with the configuration data; and wherein, prior to the step of manufacturing the computing system, based on the user requirements data entered via the single portal, an order is placed from the centralized intelligence that initiates a commercial transaction for the manufacture of the computing system, and wherein, prior to the step of providing the computing system for use by an end user, based on the user requirements data entered via the single portal, an order is placed from the centralized intelligence that initiates a commercial transaction for provision of the network services, wherein voice communications are provided via the network services.

16. The method of claim 15, further comprising the step of testing the user requirements data prior to the step of translating the user requirements data and prior to the step of initiating the second commercial transaction, wherein in response to the testing corrected or additional user requirements data are selectively prompted for entry via the portal.

17. The method of claim 15, wherein the portal comprises a web-based portal.

18. The method of claim 15, wherein the user requirements data include information determinative of the network services.

19. The method of claim 15, further comprising the step of electronically placing an order for the manufacture of the computing system, wherein the order comprises a legally binding commercial transaction for the computing system.

20. The method of claim 15, further comprising the step of producing a physical medium containing data generated based on the user requirements data, wherein the physical medium is provided with the computing system after the manufacturing step.

* * * * *